United States Patent
McEnerney

(10) Patent No.: US 8,544,597 B1
(45) Date of Patent: Oct. 1, 2013

(54) TUNED DAMPER MEMBER

(75) Inventor: Bryan William McEnerney, Canoga Park, CA (US)

(73) Assignee: Aerojet Rocketdyne of DE, Inc., Sacramento, CA (US)

(*) Notice: Subject to any disclaimer, the term of this patent is extended or adjusted under 35 U.S.C. 154(b) by 0 days.

(21) Appl. No.: 13/484,595

(22) Filed: May 31, 2012

(51) Int. Cl.
*F16F 7/00* (2006.01)

(52) U.S. Cl.
USPC .......................................... 181/207

(58) Field of Classification Search
USPC .......................................... 181/207
See application file for complete search history.

(56) References Cited

U.S. PATENT DOCUMENTS

| | | | |
|---|---|---|---|
| 2,744,002 A * | 5/1956 | Crowley | 75/359 |
| 4,004,934 A * | 1/1977 | Prochazka | 501/90 |
| 4,849,164 A * | 7/1989 | Jandeska et al. | 419/11 |
| 5,284,695 A * | 2/1994 | Barlow et al. | 264/497 |
| 5,400,296 A * | 3/1995 | Cushman et al. | 367/1 |
| 5,706,249 A * | 1/1998 | Cushman | 367/1 |
| 5,895,726 A | 4/1999 | Imam et al. | |
| 7,249,653 B2 * | 7/2007 | Sheng et al. | 181/290 |
| 7,263,028 B2 | 8/2007 | Thomas et al. | |
| 7,484,589 B2 * | 2/2009 | Guo | 181/210 |
| 7,632,565 B1 | 12/2009 | Imam et al. | |
| 7,770,693 B2 * | 8/2010 | Uejima | 181/294 |
| 7,837,008 B1 * | 11/2010 | Lane et al. | 181/284 |
| 2011/0133025 A1 | 6/2011 | Vauchel et al. | |
| 2011/0291331 A1 * | 12/2011 | Scott | 264/510 |

* cited by examiner

*Primary Examiner* — Forrest M Phillips
(74) *Attorney, Agent, or Firm* — Carlson, Gaskey & Olds, P.C.

(57) ABSTRACT

A method of making a damper member includes forming a lattice network of a first material using an additive powder forming technique. The lattice network includes interconnected pores. A matrix of a second, different material is then deposited within the interconnected pores to form a damper member having an acoustic attenuation that is tuned to dampen a target vibrational mode.

23 Claims, 2 Drawing Sheets

TUNED DAMPER MEMBER

BACKGROUND

This disclosure relates to improvements in tuning a damper member for a target vibrational mode.

Damper members are known and used to attenuate vibrations that occur in machines, such as gas turbine engines, liquid rockets, automobiles and generally any machine where vibrations are undesired. A challenge, however, in designing such damper members relates to tuning an acoustic attenuation of the damper member to a target vibrational mode. Specifically, tuning the damper member to the target vibrational mode can enhance vibrational attenuation. However, in practice, closely tuning the damper member to a target vibrational mode has proven difficult. For example, one known type of composite damper member includes a porous metal foam that is made by solidifying the metal in the presence of a foaming agent. The metal foam is then impregnated with a resin and cured to form the final composite. In such a composite structure, there is only limited ability to tune the damper member through material selection.

SUMMARY

A method of making a damper member according to an exemplary aspect of the present disclosure comprises of forming a lattice network of a first material using an additive powder forming technique. The lattice network includes interconnected pores and deposits a matrix of a second, different material within the interconnected pores to form a damper member having an acoustic attenuation tuned to dampen a target vibrational mode.

In a further non-limiting embodiment of any of the foregoing examples, the additive powder forming technique includes depositing multiple layers of a powdered material onto one another and selectively fusing the layers to one another with reference to data relating to a particular cross-section of the damper member.

A further non-limiting embodiment of any of the foregoing examples, comprising selecting a geometry of the lattice network corresponding to a geometry defined by a computer-aided design.

In a further non-limiting embodiment of any of the foregoing examples, the first material is a metallic material and the second material is selected from the group consisting of a different metallic material and a polymeric material.

In a further non-limiting embodiment of any of the foregoing examples, the second material is the polymeric material, and the polymeric material includes particulates.

In a further non-limiting embodiment of any of the foregoing examples, the particulates are ceramic.

In a further non-limiting embodiment of any of the foregoing examples, the particulates are metallic.

In a further non-limiting embodiment of any of the foregoing examples, the damper member made according to the method of claim 1.

A method of making a damper member according to an exemplary aspect of the present disclosure includes identifying a target vibrational mode to dampen, and tuning an acoustic attenuation of a damper member according to the target vibrational mode, in which the damper includes a lattice network of a first material. The lattice network includes interconnected pores, and a matrix of a second, different material within the interconnected pores. The tuning includes selecting a first acoustic impedance for the lattice network in correspondence with selecting a second, different acoustic impedance of the matrix such that the acoustic attenuation of the damper member is tuned to dampen the target vibrational mode.

A further non-limiting embodiment of any of the foregoing examples includes forming the lattice network using an additive powder forming technique.

A further non-limiting embodiment of any of the foregoing examples includes depositing the matrix within the interconnected pores.

A further non-limiting embodiment of any of the foregoing examples includes selecting a geometry of the lattice network according to the target vibrational mode to adjust the acoustic attenuation.

In a further non-limiting embodiment of any of the foregoing examples, the selected geometry corresponds to a geometry defined by a computer-aided design.

In a further non-limiting embodiment of any of the foregoing examples, the interconnected pores have an artificial randomness defined by a computer-aided design.

In a further non-limiting embodiment of any of the foregoing examples, the interconnected pores have a predetermined pattern defined by a computer-aided design.

A damper system according to an exemplary aspect of the present disclosure includes a target vibrational mode to dampen, a damper member tuned to the target vibrational mode in which the damper member includes a lattice network of a first material and the lattice network includes interconnected pores and matrix of a second, different material selected from the group consisting of metals, polymers and combinations thereof within the interconnected pores. The lattice network has a first acoustic impedance and the matrix has a second, different acoustic impedance such that the damper member has an acoustic attenuation tuned to dampen the target vibrational mode.

In a further non-limiting embodiment of any of the foregoing examples, the lattice network has a geometry corresponding to a geometry defined by a computer-aided design.

In a further non-limiting embodiment of any of the foregoing examples, the first material is metallic and the second material is polymeric.

In a further non-limiting embodiment of any of the foregoing examples, the first material is a first metallic material and the second material is a second metallic material different from the first metallic material in composition.

In a further non-limiting embodiment of any of the foregoing examples, the interconnected pores have an artificial randomness defined by a computer-aided design.

In a further non-limiting embodiment of any of the foregoing examples, the interconnected pores have a predetermined pattern defined by a computer-aided design.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
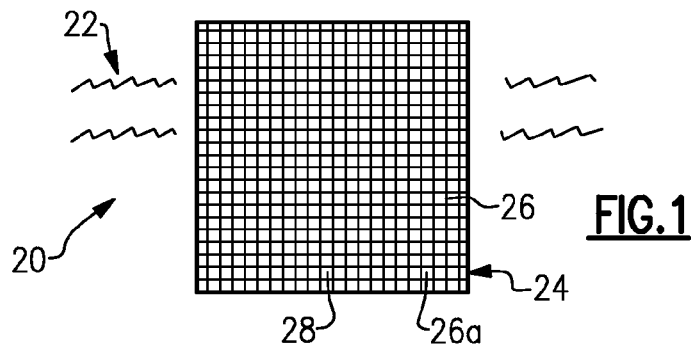
FIG. 1 illustrates an example damper system.

FIG. 1 illustrates selected portions of an example damper system 20, which may be used as a non-structural/non-load bearing component. As will be appreciated, the damper system 20 is shown with a generic shape for the purposes of description, but can be designed with a shape adapted for the particular application. It is to be understood that the damper system 20 can be applied to a variety of different applications, such as, but not limited to, gas turbine engines, rockets, automobiles or any other application that would benefit from tuned vibrational damping.

In this example, the damper system 20 includes a target vibrational mode 22 for attenuation. The target vibrational mode 22 is not limited to any particular mode but may correspond to vibrational noise or other undesired frequencies in the given application.

The damper system 20 further includes a damper member 24 that is tuned to the target vibrational mode 22. The damper member 24 includes a lattice network 26 of a first material. The lattice network 26 includes interconnected pores 26a. The interconnected pores 26a are filled, completely or at least partially, with a matrix 28 of a second, different material. The lattice network 26 has a first acoustic impedance and the matrix 28 has a second, different acoustic impedance.

The compositions and amounts of the first and second materials of the respective lattice network 26 and matrix 28, along with a geometry of the lattice network 26 and the matrix 28, are selected to tune the acoustic attenuation according to the target vibrational mode 22. The term "tuned" and variations thereof as used in this disclosure refer to a characteristic damping mode that is adjusted relative to a specified target. In other words, a damper that is "tuned" to a specified target vibrational mode has been adjusted according to the target vibrational mode to enhance acoustic attenuation of the target vibrational mode.

Acoustic attenuation is a measure of energy loss of vibrational propagation in a material. One mechanism of acoustic attenuation is thermal dissipation in the material through which the vibrations propagate. By providing different materials and relative amounts for the lattice network 26 and the matrix 28, with different impedances, the acoustic attenuation can be tuned. Additionally, the structure of the lattice network 26 and the matrix 28 can further enhance acoustic attenuation through acoustic scattering, as propagating vibrations encounter the lattice network 26 and the matrix 28. Thus, in combination with material selection, geometry selection can be used to further tune the damper member 24.

As an example, the first material of the lattice network 26 is a metallic material and the second material of the matrix 28 is a different metallic material or a polymeric material. In one example, the polymeric material includes particulates, such as ceramic particulates, metal particulates or combinations thereof, to adjust the acoustic impedance of the second material relative to the first material to achieve a desired acoustic attenuation of the damper member 24.

Figure 2:
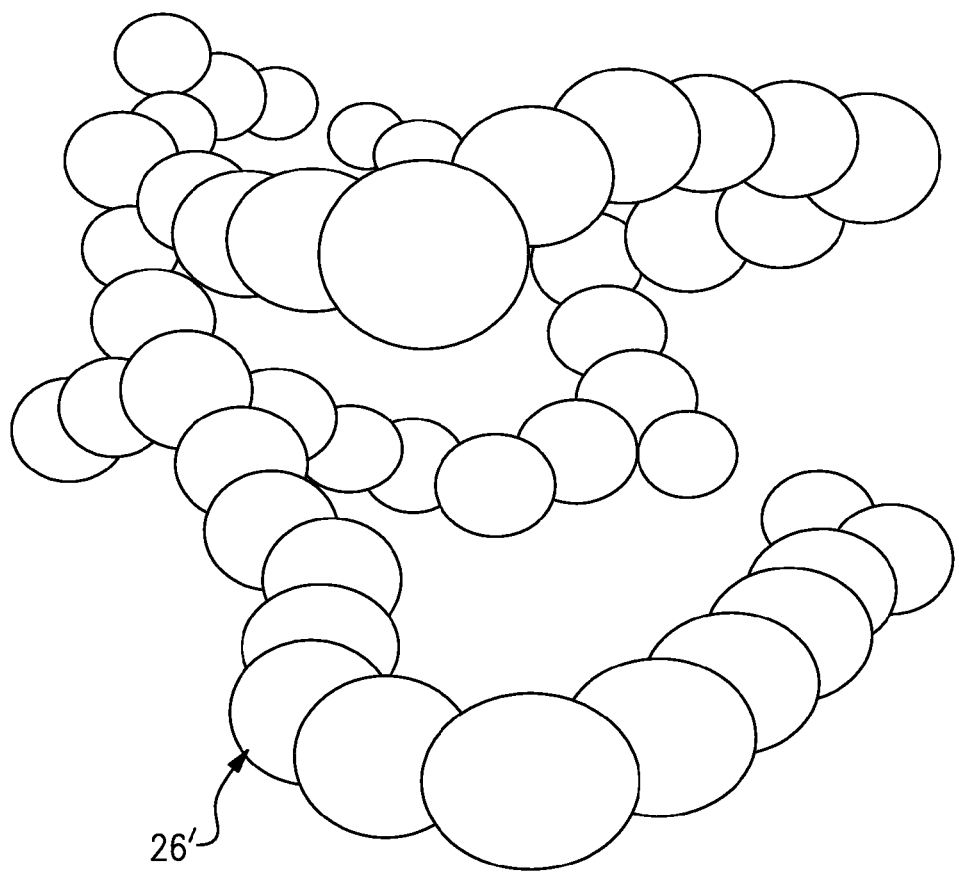
FIG. 2 illustrates an example artificially random geometry of a lattice network.

The geometry of the lattice network 26 is also selected to tune the damper member 24 according to the target vibrational mode 22. In the illustrated example, the lattice network 26 has a predetermined pattern. The predetermined pattern shown is a mesh structure. Alternatively, as shown in FIG. 2, the lattice network 26' has an artificially random geometry. That is, the randomness of the lattice network 26', and thus also the interconnected pores 26a, is not naturally determined during formation the lattice network 26' but instead is determined prior to formation of the lattice network 26', such as by a random pattern or number generator, and then adopted by the lattice network 26' using computer-aided design (CAD) and the additive powder forming technique described below. Specifically, the geometry defined by the computer-aided design can be tailored according to the target vibrational mode 22 to tune the acoustic attenuation of the damper member 24.

Figure 3:
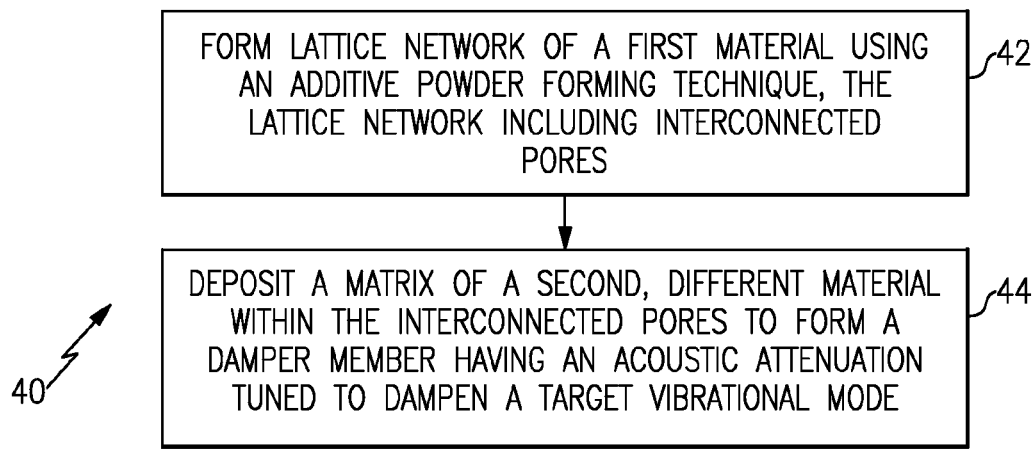
FIG. 3 illustrates an example method of making a damper member.

FIG. 3 shows a method 40 of making the damper member 24. The method 40 generally includes a forming step 42 and a deposition step 44. The forming step 42 includes forming the lattice network 26 of the first material using an additive powder forming technique. The deposition step 44 includes depositing the matrix 28 of the second, different material within the interconnected pores 26a to form the damper member 24 within an acoustic attenuation that is tuned to dampen the target vibrational mode 22.

The additive powder forming technique includes depositing multiple layers of a powdered material onto one another and then selectively fusing the layers to one another with reference to data relating to a particular cross-section of the damper member 24. Typically, forming pores or a porous structure is subject to variation from the use of foaming agents and the like that are difficult to control to form a desired geometry. However, the additive powder forming technique enables formation of the lattice network 26 with a geometry that is specifically selected according to the target vibrational mode 22. Thus, the additive powder forming technique can be used to make the patterned structure, as shown in FIG. 1, or the artificially random structure, as shown in FIG. 2, to tailor the acoustic attenuation of the damper member 24.

As a further example, the data that is used to control the fusing of the layers to one another in the additive powder forming technique is computer-aided design data. Thus, the geometry of the lattice network 26 corresponds to a geometry defined by the computer-aided design data.

The deposition technique used to deposit the second material into the interconnected pores 26a of the lattice network 26 can be selected based upon the composition selected for the second material. For instance, transfer molding, injection molding, casting, impregnation, melt infiltration, vapor deposition or other techniques can be used.

Figure 4:
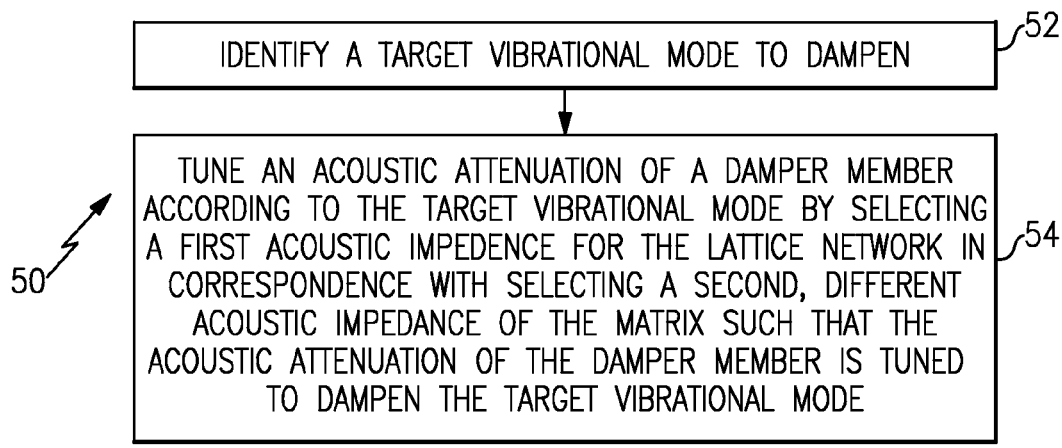
FIG. 4 illustrates another example aspect of making a damper member.

In a further aspect, FIG. 4 also illustrates a method 50 of making the damper member 24. In this example, the method 50 includes an identification step 52 and a tuning step 54. The identification step 52 includes identifying the target vibrational mode 22 that is to be attenuated. The target vibrational mode 22 can be a predefined vibrational mode or a vibrational mode that is determined through computerized analysis, for example.

The tuning step 54 includes tuning the acoustic attenuation of the damper member 24 according to the target vibrational mode 22. The acoustic attenuation is tuned by selecting the acoustic impedance for the lattice network 26 in correspondence with selecting the acoustic impedance of the matrix 28. In one example, the tuning of the acoustic impedances of the lattice network 26 and the matrix 28 includes selecting different materials for the lattice network 26 and the matrix 28, as described above. The acoustic attenuation of the damper member 24 can be further adjusted relative to the target vibrational mode 22 through selection of the geometry of the lattice network 26, such as the predetermined pattern mesh or artificially random geometries.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of making a damper member, the method comprising:
   forming a lattice network of a first material using an additive powder forming technique, the lattice network including interconnected pores, wherein the forming includes forming the lattice network according to an artificially random geometry determined prior to formation of the lattice network and that is not naturally determined during formation of the lattice network; and
   depositing a matrix of a second, different material within the interconnected pores to form a damper member having an acoustic attenuation tuned to dampen a target vibrational mode.

2. The method as recited in claim 1, wherein the additive powder forming technique includes depositing multiple layers of a powdered material onto one another and selectively fusing the layers to one another with reference to data relating to a particular cross-section of the damper member.

3. The method as recited in claim 1, further comprising selecting a geometry of the lattice network corresponding to a geometry defined by a computer-aided design.

4. The method as recited in claim 1, wherein the first material is a metallic material and the second material is selected from the group consisting of a different metallic material and a polymeric material.

5. The method as recited in claim 4, wherein the second material is the polymeric material, and the polymeric material includes particulates.

6. The method as recited in claim 5, wherein the particulates are ceramic.

7. The method as recited in claim 5, wherein the particulates are metallic.

8. The damper member made according to the method of claim 1.

9. The method as recited in claim 1, including determining the artificially random geometry using a random pattern generator.

10. The method as recited in claim 1, including determining the artificially random geometry using a random number generator.

11. The method as recited in claim 1, wherein the depositing of the matrix partially fills the interconnected pores.

12. A method of making a damper member, the method comprising:
    identifying a target vibrational mode to dampen; and
    tuning an acoustic attenuation of a damper member according to the target vibrational mode, wherein the damper includes a lattice network of a first material, the lattice network including interconnected pores, and a matrix of a second, different material within the interconnected pores, the tuning including selecting a first acoustic impedance for the lattice network in correspondence with selecting a second, different acoustic impedance of the matrix such that the acoustic attenuation of the damper member is tuned to dampen the target vibrational mode, wherein the first material is a metallic material and the second material is a different metallic material.

13. The method as recited in claim 12, including forming the lattice network and the interconnected pores according to an artificially random geometry determined prior to formation of the lattice network and that is not naturally determined during formation the lattice network.

14. The method as recited in claim 12, further comprising forming the lattice network using an additive powder forming technique.

15. The method as recited in claim 14, further comprising depositing the matrix within the interconnected pores.

16. The method as recited in claim 12, further comprising selecting a geometry of the lattice network according to the target vibrational mode to adjust the acoustic attenuation.

17. The method as recited in claim 16, wherein the selected geometry corresponds to a geometry defined by a computer-aided design.

18. The method as recited in claim 12, wherein the interconnected pores have an artificial randomness defined by a computer-aided design.

19. A damper system comprising:
    a target vibrational mode to dampen;
    a damper member tuned to the target vibrational mode, the damper member including a lattice network of a first material, the lattice network including interconnected pores, and a matrix of a second, different material selected from the group consisting of metals, polymers and combinations thereof within the interconnected pores, wherein the lattice network has a first acoustic impedance and the matrix has a second, different acoustic impedance such that the damper member has an acoustic attenuation tuned to dampen the target vibrational mode, the lattice network having an artificially random geometry determined prior to formation of the lattice network and that is not naturally determined during formation of the lattice network.

20. The damper system as recited in claim 19, wherein the lattice network has a geometry corresponding to a geometry defined by a computer-aided design.

21. The damper system as recited in claim 19, wherein the first material is metallic and the second material is polymeric.

22. The damper system as recited in claim 19, wherein the first material is a first metallic material and the second material is a second metallic material different from the first metallic material in composition.

23. The damper system as recited in claim 19, wherein the interconnected pores have an artificial randomness defined by a computer-aided design.

* * * * *